US012619497B2

(12) United States Patent
Juneja et al.

(10) Patent No.: US 12,619,497 B2
(45) Date of Patent: May 5, 2026

(54) FAILOVER HANDLING FOR PODS EXECUTING AN APPLICATION IN A HIGH AVAILABILITY MODE

(71) Applicant: Oracle International Corporation, Redwood City, CA (US)

(72) Inventors: Rohit Juneja, Stittsville (CA); Pardhiva Janardhana Krishna Munnaluru, Apex, NC (US)

(73) Assignee: Oracle International Corporation, Redwood City, CA (US)

( * ) Notice: Subject to any disclaimer, the term of this patent is extended or adjusted under 35 U.S.C. 154(b) by 105 days.

(21) Appl. No.: 18/352,445

(22) Filed: Jul. 14, 2023

(65) Prior Publication Data

US 2025/0021437 A1    Jan. 16, 2025

(51) Int. Cl.
*G06F 11/00*       (2006.01)
*G06F 11/14*       (2006.01)
*G06F 11/1482*     (2026.01)
*G06F 11/20*       (2006.01)

(52) U.S. Cl.
CPC .......... *G06F 11/14* (2013.01); *G06F 11/1484* (2013.01); *G06F 11/203* (2013.01)

(58) Field of Classification Search
CPC ..................... G06F 11/1484; G06F 11/203
See application file for complete search history.

(56) References Cited

U.S. PATENT DOCUMENTS

| | | | | |
|---|---|---|---|---|
| 11,838,176 | B1* | 12/2023 | Vanjare ................. | G06F 9/4451 |
| 11,848,910 | B1* | 12/2023 | Zou ....................... | H04L 41/044 |
| 2018/0113750 | A1* | 4/2018 | Yoon ..................... | G06F 9/5083 |
| 2020/0034254 | A1* | 1/2020 | Natanzon ................ | G06F 9/455 |
| 2022/0116285 | A1 | 4/2022 | Abdollahi Vayghan et al. | |
| 2022/0391294 | A1* | 12/2022 | Kulkarni ............... | G06F 9/5072 |
| 2023/0082186 | A1* | 3/2023 | Balcha ................ | G06F 11/2094 |
| | | | | 714/4.11 |
| 2023/0337019 | A1* | 10/2023 | Mehta ................... | H04W 24/04 |
| 2024/0061751 | A1* | 2/2024 | Janarthanam ....... | G06F 11/2097 |
| 2024/0070038 | A1* | 2/2024 | Kangarlou ........... | G06F 11/203 |
| 2024/0103494 | A1* | 3/2024 | Sandler .................... | G06F 8/60 |

OTHER PUBLICATIONS

International Search Report and Written Opinion for PCT Application No. PCT/US2024/037654 mailed Oct. 22, 2024, 13 pages.

* cited by examiner

*Primary Examiner* — Elmira Mehrmanesh

(57)                    ABSTRACT

The technology disclosed herein enables a service manager of a container orchestration platform to handle failovers of pods executing an application in a high availability mode. In a particular example, a method includes receiving pod information including unique application identifiers generated by the application and indications of which of the pods are active and standby. The method further includes configuring service objects provided by the container orchestration platform of the pods to each correspond to respective ones of the pods based on the unique application identifiers. The method also includes receiving updated pod information indicating a first pod of the pods, which was on standby, is now active having first application identifier of the unique application identifiers previously assigned to a second pod that failed. Additionally, the method includes reconfiguring a service object associated with the first application identifier to correspond to the first pod instead of the second pod.

16 Claims, 6 Drawing Sheets

RECEIVE POD INFORMATION WITH APP ID AND POD ROLE FOR PODS 122-123    201

CONFIGURE SERVICE OBJECTS 104-105 TO CORRESPOND TO RESPECTIVE PODS 102-103 BASED ON APP IDS    202

RECEIVE UPDATED POD INFORMATION WITH NEW APP ID AND POD ROLE FOR POD 103    203

RECONFIGURE SERVICE OBJECT 104 TO CORRESPOND TO POD 103    204

200

FAILOVER HANDLING FOR PODS EXECUTING AN APPLICATION IN A HIGH AVAILABILITY MODE

BACKGROUND

Container orchestration platforms, such as Kubernetes®, manage deployment of containerized applications in what are commonly referred to as pods. Each pod may include one or more containers for executing application processes therein. Kubernetes is at least one platform that does not natively include features that support high availability for an application executing in pods. For instance, an application that supports high availability may designate a set of active pods and a set of standby pods. If one of the active pods fails, then the application will designate one of the standby pods to take over for the failed pod. However, since Kubernetes does not support the application's failover capabilities, a service object that avails one or more of the pods to a network will still point to the failed pod once that pod is respawned within the standby set as directed by the application. The service will not point to the pod that the application activated to take over for the failed pod.

SUMMARY

The technology disclosed herein enables a service manager of a container orchestration platform to handle failovers of pods executing an application in a high availability mode. In a particular example, a method includes receiving pod information about the pods. The pod information includes unique application identifiers generated by the application for the pods and indications of which of the pods are active and which of the pods are on standby. The pods are orchestrated by the container orchestration platform. The method further includes configuring service objects provided by the container orchestration platform to each correspond to respective ones of the pods based on the unique application identifiers. The service objects expose corresponding ones of the pods to a network. The method also includes receiving updated pod information indicating a first pod of the pods, which was previously on standby, is now active with a first application identifier of the unique application identifiers previously assigned to a second pod of the pods that failed. Additionally, the method includes reconfiguring a service object of the service objects associated with the first application identifier to correspond to the first pod instead of the second pod.

In other examples, an apparatus performs the above-recited method and program instructions stored on computer readable storage media direct a processing system to perform the above-recited method.

DETAILED DESCRIPTION

Container orchestration platforms that organize containers into pods may use service objects (often simply referred to as services) to avail those pods to a communication network. When data on a network is intended for an application executing in a pod, a service object implemented by the container orchestration platform and corresponding to the pod directs the data to the pod. Kubernetes is an example container orchestration platform that uses service objects but other container orchestration platforms may use service objects, or something analogous thereto, in a similar manner. Traditionally, when a pod fails, a service object will continue to associate with that pod. As such, communications with the pod and processing by the pod will stop until the pod has recovered (e.g., is respawned by the container orchestration platform). Even if the pod takes a relatively small amount of time to recover, the time may still be enough to have adverse consequences for functionality being provided by an application executing in the pod. For example, if the application provides transcoding functionality for real-time user communication sessions, then failure of the pod may cause an undesirable gap in communications or may cause the sessions to drop altogether.

An application may be configured to operate in a high availability mode across the pods to avoid issues caused by a pod's failure. When an active pod fails, another pod waiting on standby can be activated by the application to take the place of the failed pod. However, the service object for the failed pod will not automatically switch its association from the failed pod to the newly activated pod, which prevents the application in the newly activated pod from taking over for the application in the failed pod. The service managers described in the examples below reconfigure a service object when a failure occurs in a pod associated therewith. The service manager identifies the newly activated pod and associates the service object with the newly activated pod instead of the failed pod. Communications that were to be exchanged with the failed pod can then be exchanged with the newly activated pod in place of the failed pod.

Figure 1:
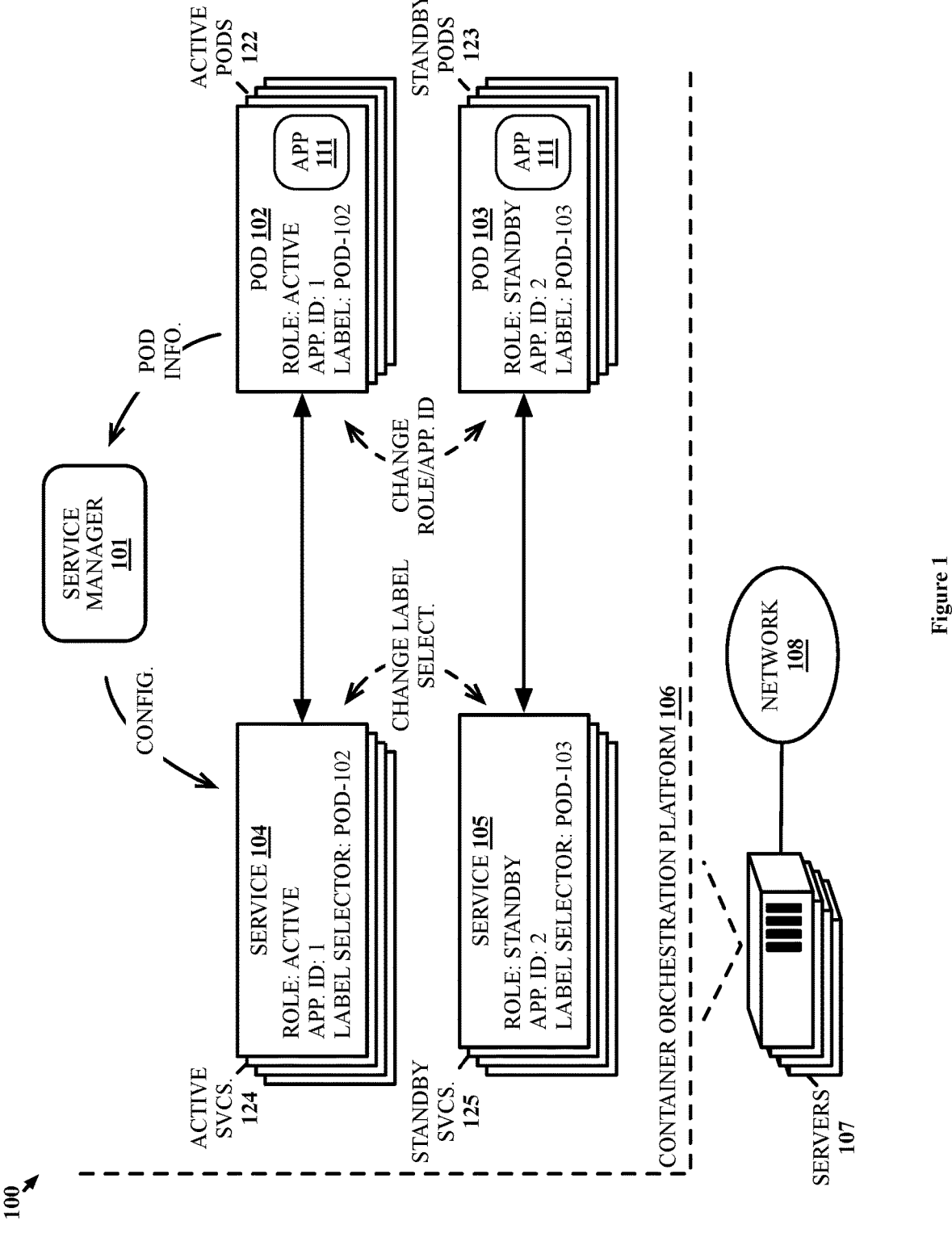
FIG. 1 illustrates an implementation for handling failover of pods executing an application in a high availability mode.

FIG. 1 illustrates implementation 100 for handling failover of pods executing an application in a high availability mode. Implementation 100 includes service manager 101, active pods 122, standby pods 123, active services 124, standby services 125, servers 107, and communication network 108. Active pods 122, standby pods 123, active services 124, and standby services 125 implemented by container orchestration platform 106 and execute on one or more servers 107 (although, other types of computing systems may be used). Communication network 108 links servers 107 together and may connect servers 107 with other systems and networks (e.g., the Internet). Service manager 101 is an application process executed by servers 107 for managing active services 124 and standby services 125. Service manager 101 may be implemented in a pod executing on servers 107. In some examples, service manager 101 may be a process executing on a computing system other than servers 107 and in communication with servers 107 over communication network 108.

In operation, application 111 is an application that supports operating in a high availability mode within pods orchestrated by container orchestration platform 106. Application 111 may perform any type of processing function. In this example, application 111 is executing within one or more active pods 122 and standby pods 123. The instances of application 111 that are executing in active pods 122 are active and ready to perform as configured (e.g., process incoming communications) if not actively performing already. The instances of application 111 executing in standby pods 123 are on standby and will not perform actively until activated (e.g., when a one of active pods 122 fails). Active services 124 are service objects that expose active pods 122 (i.e., make active pods 122 accessible) to a network over which active pods 122 can exchange communications. The network may be a logical network connecting pods. Similarly, service object 105 are service objects that expose standby pods 123 to the network. Although, since standby pods 123 are on standby, little to no such communications are typically exchanged with standby pods 123.

While a single service object in other examples may service multiple pods, the service objects in this example have a one-to-one correspondence with their associated pods. For example, service object 104 is one of active services 124 and is associated with pod 102 of active pods 122. A different service object of active services 124 would then be associated with another pod of active pods 122. Likewise, service object 105 is one of standby services 125 and is associated with pod 103 of standby pods 123. A different service object of standby services 125 would then be associated with another pod of standby pods 123. Service manager 101 maintains this one-to-one correspondence to ensure one of active services 124 is connected to one of active pods 122 even when one of active pods 122 fails.

Figure 2:
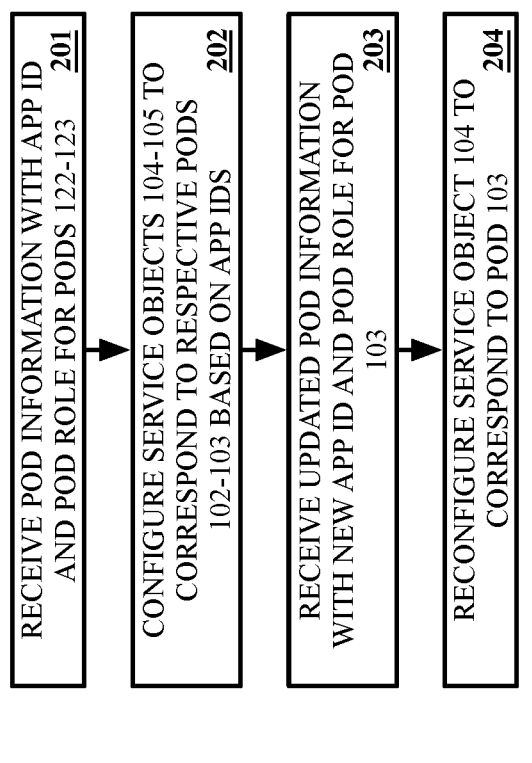
FIG. 2 illustrates an operation to handle failover of pods executing an application in a high availability mode.

FIG. 2 illustrates operation 200 to handle failover of pods executing an application in a high availability mode. In operation 200, service manager 101 receives pod information about pods 122-123 (201). The pod information includes unique application identifiers generated by application 111 for pods 122-123 and indications of which of the pods are active (i.e., included in active pods 122) and which of the pods are on standby (i.e., included in standby pods 123). The unique application identifiers can be any data (e.g., character, string of characters, numbers, etc.) that is unique at least among active pods 122, although, the unique application identifiers may be unique among all of pods 122-123. In this example, for simplicity the unique application identifiers are single digit numbers. For instance, 1 is the unique application identifier for pod 102 and 2 is the unique application identifier for pod 103. The unique application identifiers may be assigned by application 111 (e.g., application 111 on each pod may assign its own unique application identifier after ensuring the uniqueness of the unique application identifier) or may be assigned by an application controller for application 111. Pods 122-123 are identified to service manager 101 by their respective labels. Like the unique application identifiers, a label can be any data that uniquely identifies a particular pod from amongst others of pods 122-123. For clarity, the pod labels in this example closely relate to the reference numbers used in implementation 100 for pods 122-123 (e.g., the label for pod 102 is POD-102).

The received pod information, therefore, informs the service manager 101 about which pods, identified by their unique labels, are active or on standby and which unique application identifier is assigned to the application 111 thereon. For instance, the pod information indicates that pod label POD-102 is associated with an active pod having unique application identifier 1 and pod label POD-103 is associated with a standby pod having unique application identifier 2. The same type of information is received for the rest of pods 122-123. In this example, each of pods 122-123 sends service manager 101 their respective portion pod information. In other examples, an application controller for application 111 may collect the pod information from pods 122-123 and pass the pod information along to service manager 101. The pod information may be pushed to service manager 101 or may be sent in response to a request from service manager 101.

Service manager 101 configures service objects 124-125 provided by container orchestration platform 106 to each correspond to respective ones of pods 122-123 based on the unique application identifiers (202). If one or more of service objects 124-125 do not already exist, then configuring service objects 124-125 includes creating those service objects that do not already exist. Each of service objects 124-125 is configured to correspond to one of pods 122-123. In this example, each of service objects 124-125 includes a label selector to select a pod which the service object is exposing to the network. Label selectors may be configured with multiple labels to enable the label selector to select from multiple pods. For example, the label selector of a service object may include three labels of pods that can be selected. The label selector can then select one of the three pods to handle incoming network traffic, which may be useful to load balance across the pods. In this case, each of service objects 124-125 corresponds to a single one of pods 122-123 rather than multiple pods so the label selectors of service objects 124-125 are only given one pod label from which to select a pod. For instance, service manager 101 configures the label selector of service object 104 to select label POD-102 and the label selector of service object 105 to select label POD-103. Service manager 101 further associates each of service objects 124-125 with the unique application identifier of the pod having the label the label selector is configured to select. For example, service object 104 is associated with unique application identifier 1 because pod 102 is assigned unique application identifier 1 and service object 105 is associated with unique application identifier 2 because pod 103 is associated with unique application identifier 2. Service manager 101 may track the associations internally (e.g., in a data structure) or may configure service objects 124-125 to indicate the association (e.g., tag the service objects 124-125 with their respective unique application identifiers).

After configuring service objects 124-125 based on the pod information, service manager 101 receives updated pod information (203). The updated pod information in this example indicates pod 103, which was previously on standby, is now active and associated with unique application identifier 1, which was previously assigned to pod 102. Pod 103 is now active because pod 102 failed and application 111 activated pod 103 to take the place of pod 102 in active pods 122. When activating pod 103, application 111 assigns the unique application identifier of failed pod 102 to the newly activated pod 103 so that application 111 on pod 103 can take over the tasks for application 111 on pod 102. Instances of application 111 on the remaining pods may negotiate among themselves to determine which of standby pods 123 should be activated upon determining pod 102 failed or a controlling instance of application 111 may determine which of standby pods 123 should be activated. Like the pod information from above, the updated pod information may be received directly from pod 103 or may be received from an application controller.

In response to being notified in the updated pod information that pod 103 is now active with Unique Application Identifier 1, service manager 101 reconfigures service object 104 to correspond to pod 103 instead of pod 102 (204). To reconfigure service object 104, service manager 101 may first identify the service object associated with unique application identifier 1 from within active services 124, which is service object 104 in this case. Service manager 101 may then change the label selector of service object 104 to select the label for pod 103, which is POD-103. After reconfiguring, any network traffic that service object 104 would have directed to pod 102 would instead be directed to pod 103, as service object 104 is still associated with the pod having unique application identifier 1.

Service object 105, which was associated with pod 103 when pod 103 was on standby, may not be reconfigured by service manager 101, at least not immediately. Since service object 105 is one of standby services 125, it does not matter that service object 105 still has a label selector configured to select pod 103 because standby services 125 do not actually handle traffic due to their standby role. Once pod 102 recovers from its failure, service manager 101 may receive updated pod information notifying service manager 101 that pod 102 has recovered. For example, the updated pod information may indicate that the pod having label POD-102 is on standby with the unique application identifier 2. Service manager 101 may then identify service object 105 as being the one of standby services 125 associated with unique application identifier 2 and configure the label selector of service object 105 to select pod label POD-103.

Figure 3A:
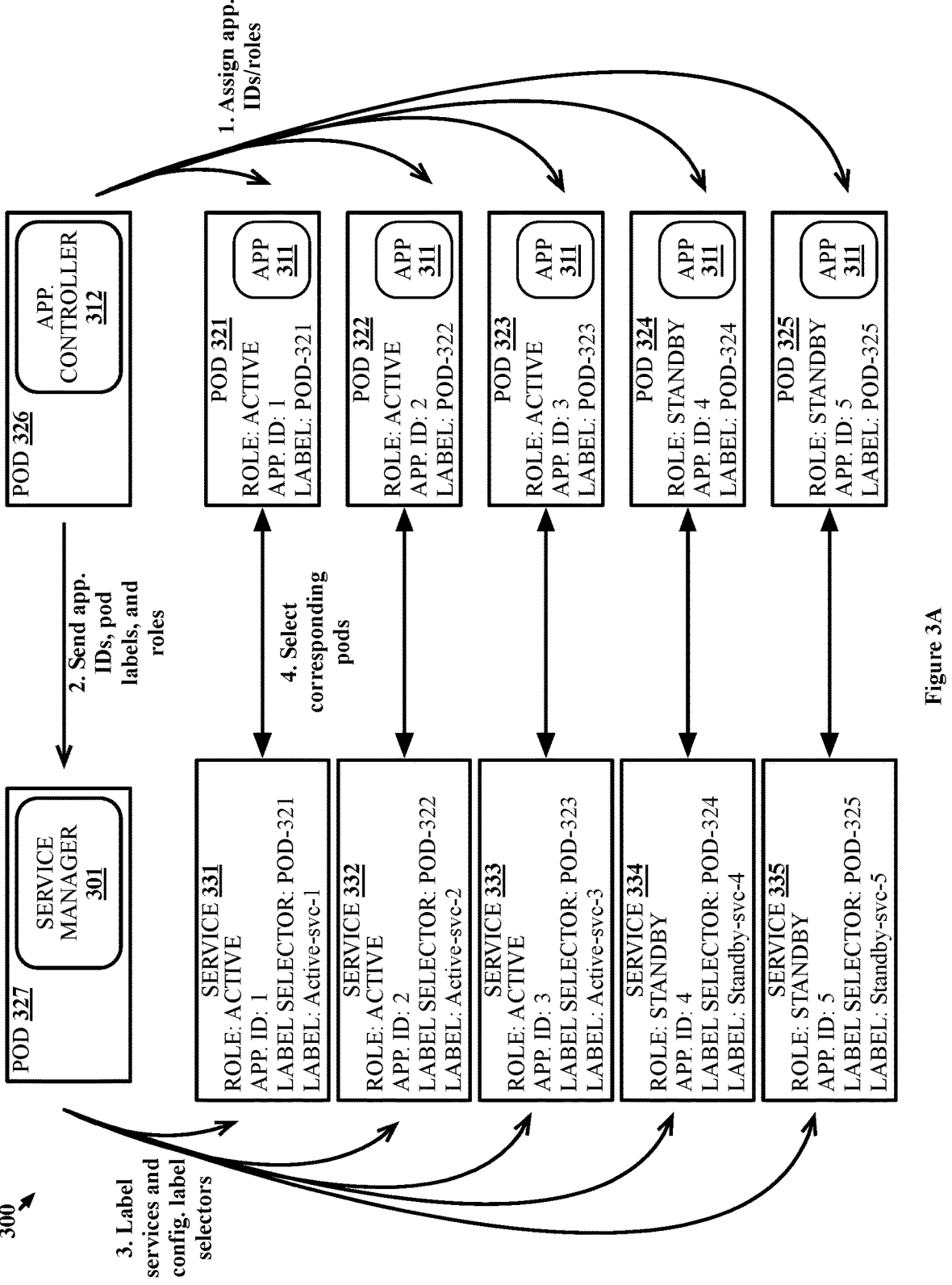
FIG. 3A illustrates an operational scenario for handling failover of pods executing an application in a high availability mode.

FIG. 3A illustrates operational scenario 300 for handling failover of pods executing an application in a high availability mode. In operational scenario 300, application 311 is executing in pods 321-325 and supports high availability. Application 311 is managed by application controller 312 which is executing in pod 326. Application controller 312 regulates the number of pods that are executing application 311, which of those pods are active versus standby, and handles pod information updates to service manager 301. In other examples, rather than being a distance process, one instance of application 311 may be designated a master and perform similar functions to that described for application controller 312. Like application controller 312, service manager 301 executes in pod 327 and manages service objects 331-325 for respective ones of pods 321-325. While not shown, pods 321-327 and service objects 331-335 are executing on a container orchestration platform like container orchestration platform 106 and on computing systems like servers 107.

During operational scenario 300, application controller 312 determines that application 311 will execute with three active application pods and two standby application pods. The number of active versus standby pods may be defined by a user, coded into application controller 312, requested by application 311, or may be indicated from some other source. In some examples, the number of active pods for application 311 may be dependent on demand for application 311 and the number of standby pods may be determined as a ratio of the active pods. With respect to this example, the ratio may indicate that the number of standby pods should be 40% of the number of active pods, which leads to the 3-2 ratio of active to standby pods. Accordingly, application controller 312 directs the container orchestration platform to create pods 321-325 with application 311 therein and assigns unique application identifiers and roles at step 1 to each of pods 321-325. Like in the example above, the unique application identifier for each of pods 321-325 is a single digit number but can be any data that is unique among the others of pods 321-325. In this example, application controller 312 designates pods 321-323 to be active and pods 324-325 to be on standby. Pods 321-325 are also shown to have pod labels related to their reference numbers in operational scenario 300, although, other unique identifiers may be used for the labels. The pod labels may be automatically assigned by the container orchestration platform, may be assigned by application controller 312, or may be assigned by some other source.

Application controller 312 also sends the unique application identifiers with their associated pod labels and roles at step 2 to service manager 301. Based on the information received from application controller 312, service manager 301 is aware of which pods, as identified by their labels, are active/standby and their respective unique application identifiers. In response to the information, service manager 301 labels and configures service objects 331-335 to correspond to respective ones of pods 321-325 at step 3. The labels for service objects 331-335 can be any data but, in this example, service manager 301 uses the labels to indicate information about the pods with which each of service objects 331-335 is associated. For instance, the label selector of service object 331 is configured to select label POD-321 to select pod 321. Pod 321 is active and has unique application identifier 1 so service manager 301 labels service object 331 with the label Active-svc-1. Similarly, service object 334 is labelled Standby-svs-4 because the label selector for service object 334 is configured to select label POD-324 for pod 324, which is a standby pod. The remaining ones of service objects 331-335 are also labelled and configured similarly based on their corresponding ones of pods 321-325. When handling network traffic each of service objects 331-335, as configured, will select a single corresponding one of pods 321-325 at step 4.

Figure 3B:
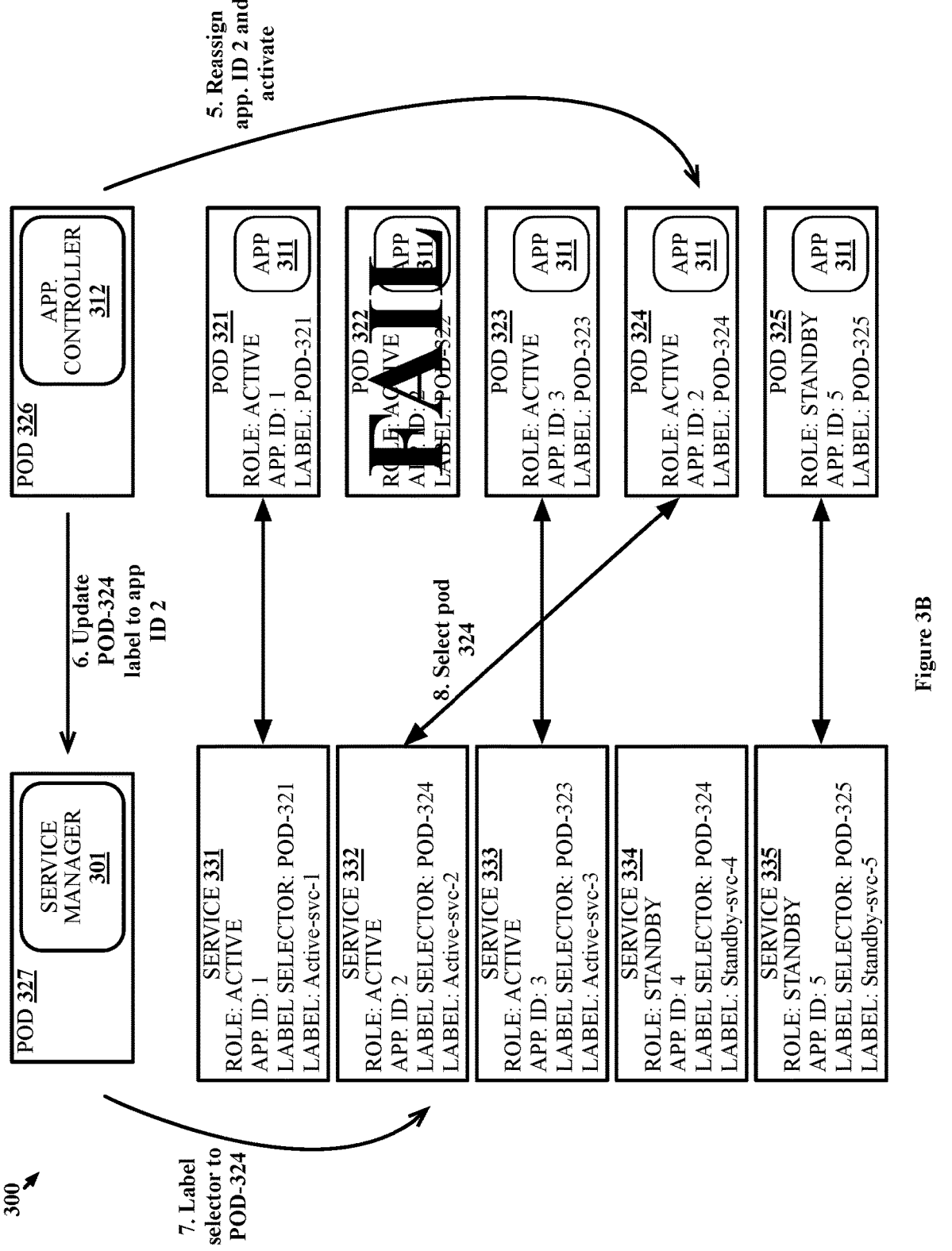
FIG. 3B illustrates an operational scenario for handling failover of pods executing an application in a high availability mode.

FIG. 3B illustrates additional steps of operational scenario 300 for handling failover of pods executing an application in a high availability mode. Pod 322 fails in this example. In response to determining that pod 322 failed, application controller 312 reassigns unique application identifier 2, which was assigned to pod 322, to pod 324 and changes the role of pod 324 to active at step 5. Application controller 312 may have determined pod 322 failed because pod 322 stopped responding to messages from application controller 312, application controller 312 stopped receiving heartbeat messages from pod 322, or based on some other indication that pod 322 has failed. Since simply changing pod 324 to active will not enable pod 324 to take over for pod 322, application controller 312 sends updated information at step 6 to service manager 301. The updated information indicates that the pod with label POD-324 (i.e., pod 324) is now associated with unique application identifier 2. The updated information may explicitly indicate that pod 322 is no longer associated with unique application identifier 2 and/or has failed or service manager 301 may infer from the updated information that pod 322 is no longer active with unique application identifier 2.

In response to receiving the updated information, service manager 301 identifies service object 332 as being the service object that corresponds to unique application identifier 2 and updates the label selector of service object 332 at step 7 to select the label POD-324 instead of POD-322, which was previously the pod label associated with unique application identifier 2. The label of service object 332 itself need not be changed because it is still associated with an active pod having unique application identifier 2. Updating the label selector in service object 332 causes service object 332 to select pod 324 to handle network traffic at step 8 rather than selecting pod 322 as previously would have occurred.

Figure 3C:
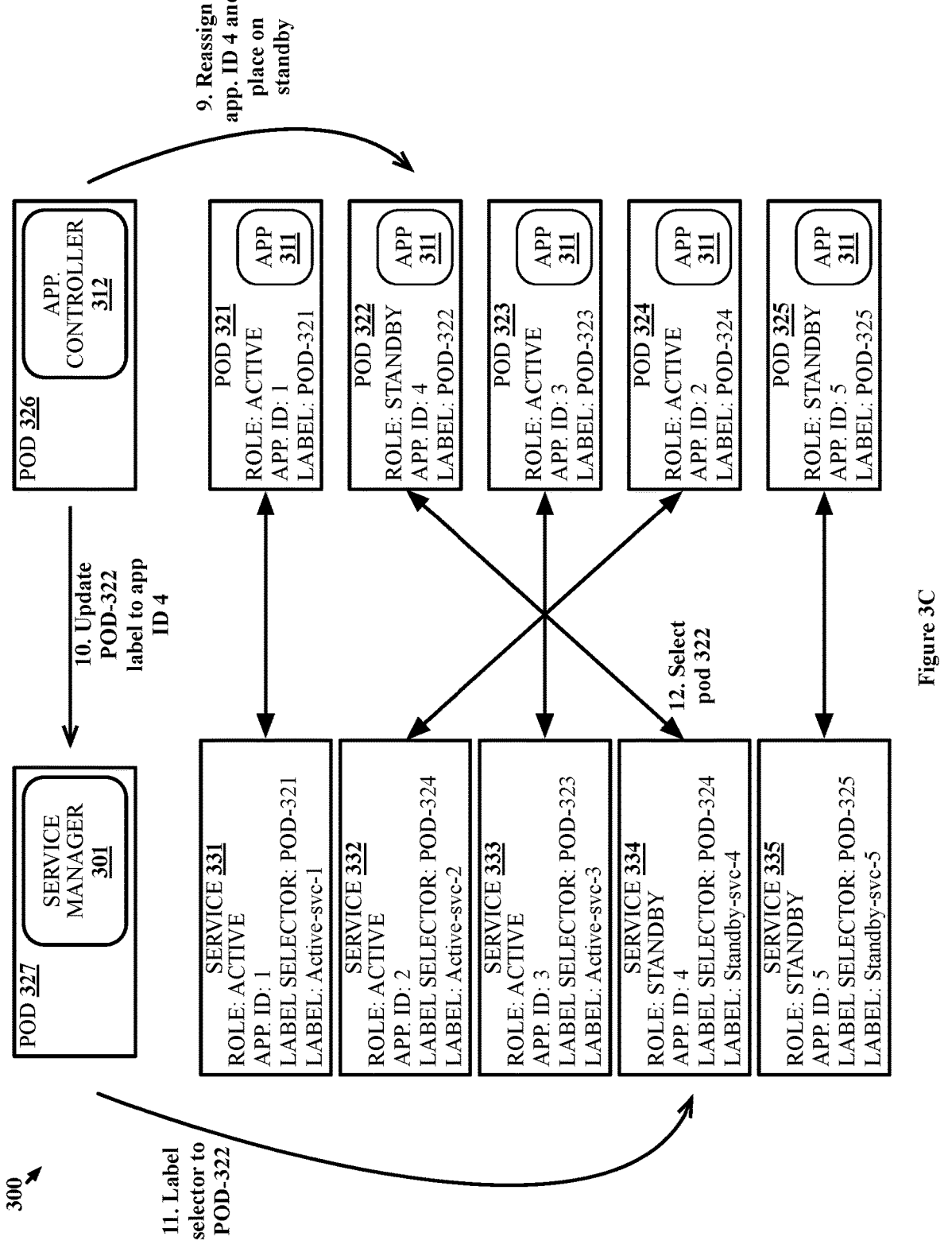
FIG. 3C illustrates an operational scenario for handling failover of pods executing an application in a high availability mode.

FIG. 3C illustrates further steps of operational scenario 300 for handling failover of pods executing an application in a high availability mode. Pod 322 recovers from the failure described above (e.g., is respawned by the container orchestration platform). Upon application controller 312 recognizing the pod 322 has recovered, application controller 312 reassigns unique application identifier 4 to pod 322 and places pod 322 on standby at step 9. Unique application identifier 4 was previously the unique application identifier assigned to pod 324 prior to pod 324 being activated. Application controller 312 assigns unique application identifier 4 rather than a different unique application identifier because a service object (i.e., service object 334) is already associated with unique application identifier 4 from when pod 324 was assigned unique application identifier 4.

Application controller 312 sends updated information at step 10 to service manager 301. The updated information indicates that the pod with label POD-322 (i.e., pod 322) is now associated with unique application identifier 4. In response to receiving the updated information, service manager 301 identifies service object 334 as being the service object that corresponds to unique application identifier 4 and updates the label selector of service object 334 at step 11 to select the label POD-322 instead of POD-324, which was previously the pod label associated with unique application identifier 4. The label of service object 334 itself need not be changed because it is still associated with a standby pod having unique application identifier 4. Updating the label selector in service object 334 causes service object 334 to select pod 322 to handle network traffic at step 12 rather than selecting pod 322 as previously would have occurred. Granted, since pod 324 is a standby pod, no traffic will likely be exchanged with pod 324 via service object 334.

Figure 4:
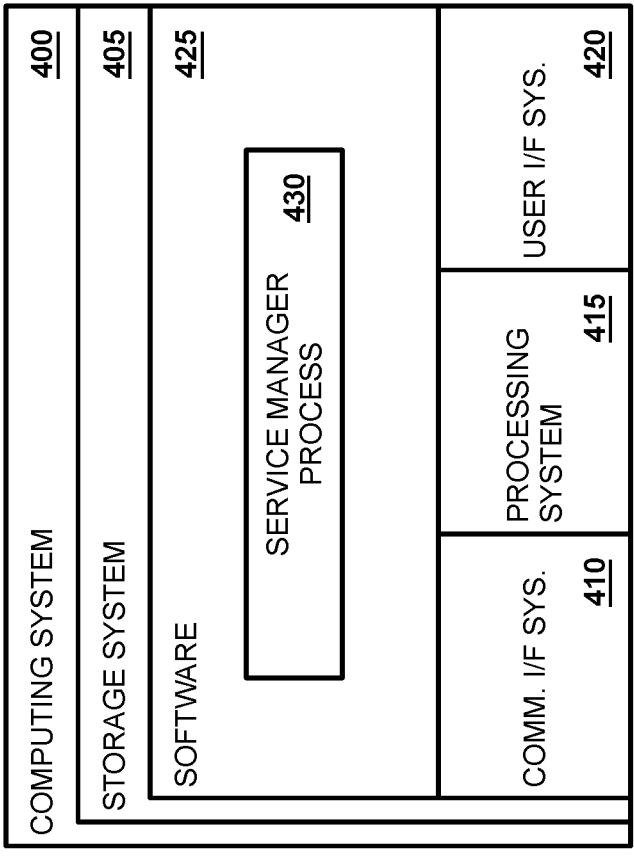
FIG. 4 illustrates a computing system for handling failover of pods executing an application in a high availability mode.

FIG. 4 illustrates a computing system 400 that is representative of any system or collection of systems in which the various processes, systems, programs, services, and scenarios disclosed herein may be implemented. Examples of computing system 400 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof. It should be understood virtualized components are executing on physical hardware like that of computing system 400.

Computing system 400 may be implemented as a single apparatus, system, or device or may be implemented in a distributed manner as multiple apparatuses, systems, or devices. Computing system 400 may include, but is not limited to, processing system 415, storage system 405, software 425, communication interface system 410, and user interface system 420. Processing system 415 may be operatively coupled with storage system 405, communication interface system 410, and user interface system 420.

Processing system 415 may load and execute software 425 from storage system 405. Software 425 may include and implement process 430, which may be representative of any of the operations for handling failover of pods executing an application in a high availability mode (e.g., operation 200). Accordingly, computing system 400 may be service manager 101 or may be a host system for a virtualized example of service manager 101 (e.g., service manager 301). Computing system 400 may also represent physical servers 107—including combinations thereof. When executed by processing system 415, software 425 may direct processing system 415 to operate as described herein for at least the various processes, operational scenarios, and sequences discussed in the foregoing implementations. Computing system 400 may optionally include additional devices, features, or functionality not discussed for purposes of brevity.

In some embodiments, processing system 415 may comprise a micro-processor and other circuitry that retrieves and executes software 425 from storage system 405. Processing system 415 may be implemented within a single processing device but may also be distributed across multiple processing devices or sub-systems that cooperate in executing program instructions. Examples of processing system 415 may include general purpose central processing units, graphical processing units, application specific processors, and logic devices, as well as any other type of processing device, combinations, or variations thereof.

Storage system 405 may comprise any memory device or computer readable storage media readable by processing system 415 and capable of storing software 425. Storage system 405 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a transitory form of signal transmission (often referred to as "signals per se"), such as a propagating electrical or electromagnetic signal or carrier wave.

In addition to computer readable storage media, in some implementations storage system 405 may also include computer readable communication media over which at least some of software 425 may be communicated internally or externally. Storage system 405 may be implemented as a single storage device but may also be implemented across multiple storage devices or sub-systems co-located or distributed relative to each other. Storage system 405 may comprise additional elements, such as a controller, capable of communicating with processing system 415 or possibly other systems.

Software 425 (including process 430 among other functions) may be implemented in program instructions may, when executed by processing system 415, direct processing system 415 to operate as described with respect to the various operational scenarios, sequences, and processes illustrated herein. For example, software 425 may include program instructions for receiving pod information about pods orchestrated by a container orchestration platform, configuring service objects provided by the container orchestration platform to each correspond to respective ones of the pods based on the information, receive updated pod information indicating a standby pod is now active with an application identifier of a failed pod, and reconfigure a service object associated with the application identifier to correspond to the newly activated pod instead of the failed pod.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 425 may include additional processes, programs, or components, such as operating system software, virtualization software, or other application software. Software 425 may also comprise firmware or some other form of machine-readable processing instructions executable by processing system 415.

In general, software 425 may, when loaded into processing system 415 and executed, transform a suitable apparatus, system, or device (of which computing system 400 is representative) overall from a general-purpose computing system into a special-purpose computing system customized to act, for example, as a connection balancer or the like as described herein. Indeed, encoding software 425 on storage system 405 may transform the physical structure of storage system 405. The specific transformation of the physical structure may depend on various factors in different implementations of this description. Examples of such factors may include, but are not limited to, the technology used to implement the storage media of storage system 405 and whether the computer-storage media are characterized as primary or secondary storage, as well as other factors.

For example, if the computer readable storage media are implemented as semiconductor-based memory, software 425 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 410 may include communication connections and devices that allow for communication with other computing systems (not shown) over communication networks (not shown). Examples of communication connections and devices that together allow for inter-system communication may include network interface cards, antennas, power amplifiers, radio-frequency (RF) circuitry, transceivers, and other communication circuitry. The communication connections and devices may communicate over communication media to exchange communications with other computing systems or networks of systems, such as metal, glass, air, or any other suitable communication media.

Communication between computing system 400 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method for a service manager to handle failover for pods executing an application in a high availability mode, the method comprising:
    receiving pod information about the pods, wherein the pod information includes unique pod names indicated in pod labels assigned to the pods, unique application identifiers generated by the application for the pods, and indications of which of the pods are active and which of the pods are on standby, and wherein the pods are orchestrated by a container orchestration platform;
    configuring service objects provided by the container orchestration platform to each correspond to respective ones of the pods based on the unique application identifiers by labelling the service objects with service labels that include the unique application identifiers of the respective ones of the pods, wherein the service objects expose corresponding ones of the pods to a network;
    receiving updated pod information indicating a first pod of the pods, which was previously on standby, is now active with a first application identifier of the unique application identifiers previously assigned to a second pod of the pods that failed; and
    reconfiguring a service object of the service objects associated with the first application identifier to select a first label of the pod labels assigned to the first pod instead of a second label of the pod labels assigned to the second pod.

2. The method of claim 1, comprising:
    receiving second updated pod information, wherein the second updated pod information indicates the second pod is now on standby with a second application identifier of the unique application identifiers previously assigned to the first pod; and
    reconfiguring a second service object of the service objects associated with the second application identifier to correspond to the second pod instead of the first pod.

3. The method of claim 1, wherein the pods transmit the pod information.

4. The method of claim 1, wherein a controller pod for the application manages the application and wherein the controller pod transmits the pod information after receiving the pod information from the pods.

5. The method of claim 4, wherein the controller pod generates the unique application identifiers on behalf of the application.

6. The method of claim 1, wherein the pod information includes a service name from the application and wherein configuring the service objects comprises:
    naming the service objects with names generated based on the pod information, wherein each of the names indicate the service name, an application identifier of a corresponding pod, and whether the corresponding pod is active or on standby.

7. The method of claim 1, wherein the service manager is implemented in another pod of the container orchestration platform.

8. An apparatus to handle failover for pods executing an application in a high availability mode, the apparatus comprising:
    one or more computer readable storage media;
    a processing system operatively coupled with the one or more computer readable storage media; and
    program instructions stored on the one or more computer readable storage media that, when read and executed by the processing system, direct the apparatus to:
        receive pod information about the pods, wherein the pod information includes unique pod names indicated in pod labels assigned to the pods, unique application identifiers generated by the application for the pods and indications of which of the pods are active and which of the pods are on standby, and wherein the pods are orchestrated by a container orchestration platform;
        configure service objects provided by the container orchestration platform to each correspond to respective ones of the pods based on the unique application identifiers by labelling the service objects with service labels that include the unique application identifiers of the respective ones of the pods, wherein the service objects expose corresponding ones of the pods to a network;
        receive updated pod information indicating a first pod of the pods, which was previously on standby, is now active with a first application identifier of the unique application identifiers previously assigned to a second pod of the pods that failed; and
        reconfigure a service object of the service objects associated with the first application identifier to select a first label of the pod labels assigned to the first pod instead of a second label of the pod labels assigned to the second pod.

9. The apparatus of claim 8, wherein the program instructions direct the processing system to:
    receive second updated pod information, wherein the second updated pod information indicates the second pod is now on standby with a second application identifier of the unique application identifiers previously assigned to the first pod; and reconfigure a second service object of the service objects associated with the second application identifier to correspond to the second pod instead of the first pod.

10. The apparatus of claim 8, wherein the pods transmit the pod information.

11. The apparatus of claim 8, wherein a controller pod for the application manages the application and wherein the controller pod transmits the pod information after receiving the pod information from the pods.

12. The apparatus of claim 11, wherein the controller pod generates the unique application identifiers on behalf of the application.

13. The apparatus of claim 8, wherein the pod information includes a service name from the application and wherein to configure the service objects, the program instructions direct the processing system to:

name the service objects with names generated based on the pod information, wherein each of the names indicate the service name, an application identifier of a corresponding pod, and whether the corresponding pod is active or on standby.

14. The apparatus of claim 8, wherein the program instructions are executed via another pod of the container orchestration platform executing on the apparatus.

15. One or more computer-readable storage media having program instructions stored thereon for handling failover for pods executing an application in a high availability mode, the program instructions, when read and executed by a processing system, direct the processing system to:

receive pod information about the pods, wherein the pod information includes unique pod names indicated in pod labels assigned to the pods, unique application identifiers generated by the application for the pods and indications of which of the pods are active and which of the pods are on standby, and wherein the pods are orchestrated by a container orchestration platform;

configure service objects provided by the container orchestration platform to each correspond to respective ones of the pods based on the unique application identifiers by labelling the service objects with service labels that include the unique application identifiers of the respective ones of the pods, wherein the service objects expose corresponding ones of the pods to a network;

receive updated pod information indicating a first pod of the pods, which was previously on standby, is now active with a first application identifier of the unique application identifiers previously assigned to a second pod of the pods that failed; and reconfigure a service object of the service objects associated with the first application identifier to select a first label of the pod labels assigned to the first pod instead of a second label of the pod labels assigned to the second pod.

16. The one or more computer-readable storage media of claim 15, wherein the program instructions direct the processing system to:

receive second updated pod information, wherein the second updated pod information indicates the second pod is now on standby with a second application identifier of the unique application identifiers previously assigned to the first pod; and reconfigure a second service object of the service objects associated with the second application identifier to correspond to the second pod instead of the first pod.

* * * * *